United States Patent [19]

Wagner

[11] Patent Number: 4,712,273
[45] Date of Patent: Dec. 15, 1987

[54] DEVICE FOR DELIVERING A PASTY STUFFING MATERIAL IN PORTIONS

[76] Inventor: Wolfgang Wagner, Sonnentauweg 21, 2067 Reinfeld, Fed. Rep. of Germany

[21] Appl. No.: 863,952

[22] Filed: May 16, 1986

[30] Foreign Application Priority Data

May 23, 1985 [DE] Fed. Rep. of Germany ....... 3518529

[51] Int. Cl.$^4$ ............................................. A22C 11/04
[52] U.S. Cl. ............................................. 17/37; 17/38
[58] Field of Search ................... 17/37, 39, 41, 49, 38, 17/33, 34, 35

[56] References Cited

U.S. PATENT DOCUMENTS

| 3,733,653 | 5/1973 | Javaloy et al. | 17/35 |
| 3,769,657 | 11/1973 | Müller | 17/35 |
| 3,883,925 | 5/1975 | Müller | 17/35 X |

FOREIGN PATENT DOCUMENTS

| 0061995 | 10/1982 | European Pat. Off. | 17/38 |
| 3246421 | 6/1984 | Fed. Rep. of Germany | 17/37 |
| 1460403 | 10/1966 | France | 17/37 |

*Primary Examiner*—Willie G. Abercrombie
*Attorney, Agent, or Firm*—Thomas R. Morrison

[57] ABSTRACT

In a device for delivering pasty stuffing in portions a vane rotor is provided in the outlet channel of conveying means charging the stuffing material with pressure, which rotor extends through the outlet channel and is driven by a positioning drive. The vane rotor thus is effective as a sealing element with regard to the stuffing material remaining under overpressure without changing the cross-section of the outlet channel, in a further function as a device for proportioning the mass of the stuffing material, which device is controllable over the angle of rotation, and finally, in the case of an activation in an opposite direction, as conveying means for compensating the expansion of the stuffing mass which occurs after the filling due to the pre-compression.

10 Claims, 2 Drawing Figures

DEVICE FOR DELIVERING A PASTY STUFFING MATERIAL IN PORTIONS

BACKGROUND OF THE INVENTION

1. Field of the Invention

The invention concerns a device for delivering a pasty stuffing material in portions, for example in the production of sausage by filling the stuffing material into hose-shaped skins or guts prepared and held ready for this purpose, the device comprising conveying means for charging the stuffing material with pressure in order to convey it into a filling pipe via an outlet channel, as well as shut-off (sealing) and controlling means being arranged in the region of the outlet channel for influencing and controlling the flow of the stuffing material and including a vane rotor extending through the cross-section of the outlet channel, the pressurized stuffing or filling material being conveyed through said outlet channel via shut-off and controlling means into said filling pipe.

2. Description of Prior Art

In a known device of this type (see German Offenlegungsschrift No. 32 46 421) a volumetric measuring device is provided which comprises a vane rotor extending over the cross-section of the filling pipe and driven by the flow of the stuffing material. The change of the angle of rotation of the vane rotor is controlled by means of a measuring device. The vane rotor is further provided with a braking device acting thereupon and controlled by the measuring device so that the described device forms a combined closing and measuring apparatus, the latter serving for determining and controlling the portioning volume.

Practice has shown it is necessary to allow an undesirably high pressure to act on the stuffing material in the operation of this device, in particular in order to safeguard a sufficient filling and portioning velocity. The necessary pressure of the stuffing material is essentially higher in this process than would be necessary for the filling process as such even in the case of a high filling speed.

These circumstances show decisively disadvantageous consequences. In particular, in the case of critical stuffing material there is an increased tendency of the material to segregate, whereas, altogether, there is a significant tendency towards quality reduction, e.g. by increased leakage on sliding sealing surfaces. Moreover, the requirement of high pressure is accompanied by important and essential requirements with regard to the filling accuracy and precision, in particular of the moving elements and the stability of the structural elements, which, on the other hand, necessitates an undesirably high expenditure in construction, manufacture and costs. Finally it should be noted that energy consumption is correspondingly higher. A further disadvantage lies in the fact that due to the high compression of the stuffing material after the closing of the sealing (shutoff) element upon reaching the desired portioning volume a corresponding expansion occurs which has the effect of an exceedingly high follow-on (trailing) flow of stuffing material. The known device does not show any possibility of compensating for this disadvantage.

A device which serves this purpose is known from German Offenlegungsschrift No. 21 37 278. This device comprises a rotary disc valve as sealing element, which has an offset portion on its side facing the free end of the filling pipe, which offset portion forms a suction chamber in the closing position. The volume of the suction chamber can be influenced by a variable stop so that the rate of re-suction can be adjusted.

Normally such a sealing element is used in portioning devices whose basic structure can e.g. be taken from European Patent Publication No. 61 995. In such devices a volumetric measuring device is provided which effects a control of the sealing (shutoff) element independent of the measuring and which in this case serves to enable a direct control of the passage of the stuffing material to be portioned. However, the above mentioned disadvantages resulting essentially from the necessary high conveying pressure are also inherent in this embodiment of the volumetric measuring device which is structured as a passively driven vane rotor. Moreover, there is the disadvantage that such shut-off or sealing elements stress the stuffing material in an undesirable manner either by shearing due to the change in the cross-section of the outlet channel during the activation or due to gap flow in particular shortly before the completion of the closing action or at the beginning of the opening of the closing element.

A further possibility of using the closing or sealing element according to German Offenlegungsschrift No. 21 37 278 is, according to the background of that publication, its application as a shutoff device of filling machines by means of which hose or gut sections are filled for producing sausages, these sausages being supplied to the consumer as a whole or in cut-off portions by weight, i.e. after dosage upon request by the consumer.

Finally mention is made of German Pat. No. 937 561 which shows a device for the metered delivery of granular bulk material and is based on the function of a metering star feeder. This known device, which is used for producing a defined mixing ratio or for controlling a certain flow rate includes an additional cellular wheel element which can be activated separately by switching and with the aid of which a mixing component having an adjustable portion of the intended mixture can be added.

This device, however, does not enable the delivery of a filling material against a pressure potential resulting e.g. from flow resistance. This structure is also not appropriate for producing small portions of high accuracy with regard to their weight and/or volume at a high frequency of portions.

3. Objects of the Invention

It is therefore an essential object of the present invention to suggest a device of the type described in the paragraph "Field of the Invention" which enables a careful and yet accurate delivery and filling with regard to weight and/or volume of any desired size of portion into hose-shaped foils (films) or guts held ready for this purpose.

It is a further object of the invention to enable such filling at high frequency or rate.

It still another important object of the invention to combine such a device with a sealing or clipping apparatus for such objects in an easy manner enabling the clearance of a defined length of the hose or gut e.g. for fixing two seals or clips behind one another.

SUMMARY OF THE INVENTION

In a device for delivering a pasty stuffing material in portions, for example in the production of sausages by filling said material into hose-shaped skins or guts and comprising conveying means for charging the stuffing material with pressure in order to convey it into a filling pipe via an outlet channel, as well as shut-off (sealing) and controlling means being arranged in the region of the outlet channel for influencing and controlling the flow of the stuffing material and including a vane rotor 5 extending through the cross-section of the outlet channel, the pressurized stuffing or filling material being conveyed through said outlet channel via said shut-off and controlling means into said filling pipe, these objects are achieved by providing a positioning drive 10 which is connected to the vane rotor. Preferably a hydraulic motor controlled by means of an incremental transmitter is used as the positioning drive, the supply and/or discharge of pressurized fluid to and from said motor, respectively, being shut-off for the purpose of an exact braking upon reaching a predetermined portioning and arresting (fixing) in the standstill or rest period. This aim can also be achieved by providing the positioning drive with and associating it to a braking device which can be controlled by the incremental transmitter. Furthermore, it is possible to activate the positioning drive in an opposite direction of rotation over a predefined angle of rotation, which enables a simple device for compensating the drips (after-running or trailing effect) of the stuffing material caused by the expansion of the same in the standstill period and moreover clearing a predetermined length of the hose or gut of stuffing material thus enabling the setting or fixing of e.g. two clips or sealings of any other type one behind the other.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawing

DETAILED DESCRIPTION OF THE PREFERRED EMBODIMENTS

Figure 1:
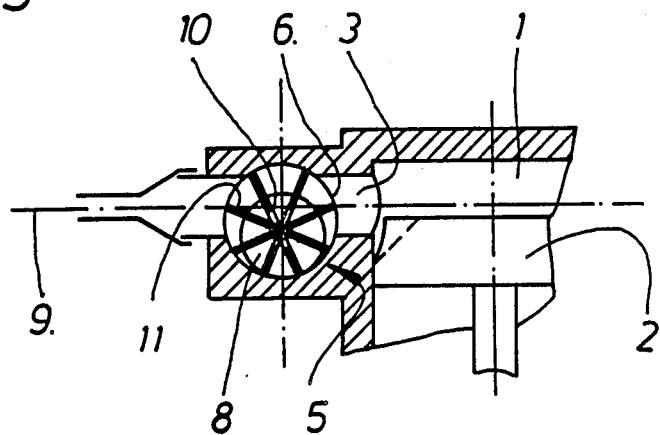
FIG. 1 shows a partial longitudinal cross-section through the device in the region of the filling pipe and FIG. 2 shows a partially cross-sectional view of the device in the plane of the axis of the vane rotor.
Figure 2:
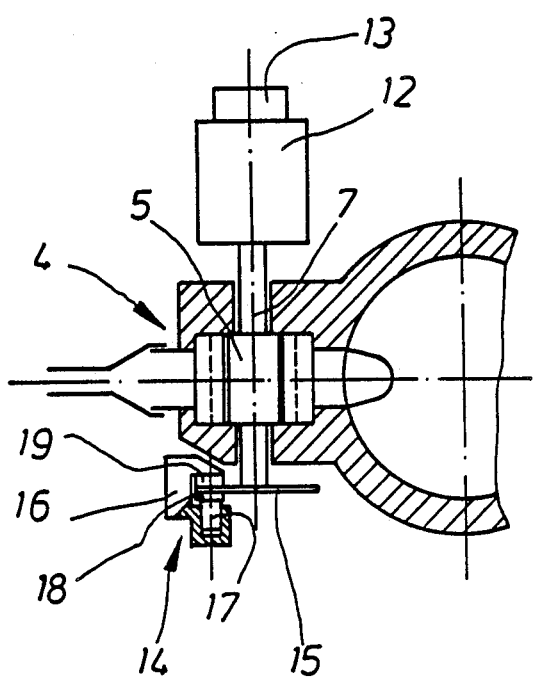

A purely schematically shown filling device for sausage stuffing or mix comprises a compression chamber 1, in which a compression plunger 2 is guided and driven in an appropriate manner, and an outlet channel 3, in which a positioning or measuring unit 4 comprising a vane rotor 5 is arranged. The vane rotor 5 is mounted pivotably about an axis 7 eccentrically in a bore 6 extending transversely through the outlet channel 3 in such a manner that a hub 8 of the rotor 5 is tangential to the wall of the bore 6 at a position furthest away from an axis 9 of the outlet channel 3. The rotor hub 8 is provided with radial slots 10 in which vanes 11 are arranged with their outer edges supported against the wall of the bore 6 by centrifugal spring force. For the purpose of transmitting a driving torque the axis 7 of the vane rotor 5 is connected with a positioning drive 12. For controlling a change in the angle of rotation of the vane rotor 5 an incremental transmitter 13 is arranged on the same axis 7. The (controlling/measuring) signals of the incremental transmitter 13 are used in a suitable manner for controlling the positioning drive 12. According to the functional principle of the latter the vane rotor 5 can further be provided with a braking device 14, which comprises a brake disc 15 encompassed by a brake caliper 16. The brake caliper 16 comprises a piston 17 acting as a plunger. This piston 17 acts directly upon a brake shoe 18 opposite one of the flanks of the brake disc 15 and indirectly, via the brake caliper 16, upon a further brake shoe 19 opposite the other flank of the brake disc 15.

The method of operation of the device is the following: The not-shown stuffing material in the form of a pasty mass present in the compression chamber 1 is put under pressure by pressure exertion of the compression plunger 2 whereby the mass tends to run off through the outlet channel 3. However, this process is counter-acted by the vane rotor 5 extending through the outlet channel 3, the arrangement and design of the vane rotor 5 being such that its stopping effects a hermetical locking or shutting-off of the outlet channel 3. For delivering a portion of the mass the vane rotor is rotated by means of the positioning drive 12, and it is locked upon reaching a predetermined portion weight or volume. This can be achieved in various manners and ways making use of the fact that there is proportionality between the angle of rotation of the vane rotor 5 and the volume of the sausage stuffing passing it. When the positioning drive 12 is a step motor, a number of steps corresponding to the desired portioning volume is allowed by means of a suitable control. On reaching this number a blocking of the vane rotor 5 occurs. If a hydraulic motor is used, the motion thereof is controlled by means of the incremental transmitter 13, whose signals are used in a given manner either for controlling a valve switching the hydraulic motor or for activating the braking device 14 in order to allow the vane rotor to become effective as locking element after the passage of the desired sausage stuffing portion.

The delivery of the portion occurs into an environment which is under atmospheric pressure, so that principally a drop of pressure of the sausage stuffing conveyed from a chamber of a higher pressure potential occurs. The accompanying change of volume of the delivered portion depends on various aspects, i.e. on the consistency of the sausage stuffing, from which the compressibility and the resiliency thereof result, on the duration of the standstill or stationary period between two portions etc. This process which influences the exactness of the positioning can be compensated by charging the positioning drive in an opposite direction over a corresponding angle of rotation after the conclusion of a portioning cycle or phase and before the next portioning cycle occurs. If the device is combined with a closing or sealing apparatus, for example one for applying double clips a stuffing-free zone of defined length can be produced after the clipping of the hose or gut by means of the clipping device behind the delivered portion by predetermining the angle of rotation which has to be passed in the return direction. Thus the area between two clips of two sausages following each other will be clear of any stuffing material.

What is claimed is:

1. A device for delivering a pasty stuffing material in portions, comprising:

pressure generating means for charging said material with a static pressure;

an outlet channel for permitting said material to move under the influence of said static pressure;

shut-off and controlling means in said outlet channel;

said shut-off and controlling means including a vane rotor;

a motor connected to said vane rotor;

said motor being effective for urging said material through said vane rotor, whereby a controlling function is performed;

means for stopping said vane rotor; and said vane rotor being effective for blocking a flow of said material through said outlet channel when said vane rotor is stopped, whereby a shut-off function is performed.

2. A device according to claim 1 wherein said motor is a hydraulic motor, and further comprising and incremental transmitter for generating a signal for controlling said hydraulic motor.

3. A device according to claim 2 wherein said means for stopping includes shutting off at least one of a supply and a discharge of pressurized fluid from said hydraulic motor.

4. A device according to claim 1 wherein said means for stopping includes a brake, and further comprising an incremental transmitter, said incremental transmitter being effective for controlling said brake.

5. A device according to claim 2 wherein said means for stopping includes a brake, and said incremental transmitter is effective for controlling said brake.

6. A device for delivering a pasty stuffing material in portions, in particular in the production of sausages by filling said stuffing material into one of hose-shaped skins and guts held in readiness for such filling, said device comprising (a) pressure generating means for charging said stuffing material with static pressure, for generating a flow of material through said device in a predetermined conveying direction, (b) outlet channel means downstream of said pressure generating means when seen in said conveying direction, into which outlet channel means said stuffing material is conveyed, (c) shut-off and controlling means being arranged in the region of said outlet channel means, influencing and controlling said flow of said stuffing material and comprising vane rotor means extending through the cross-section of said outlet channel means, (d) filling pipe means downstream of said outlet channel means, (e) positioning drive means, connected with said vane rotor means, said pressurized stuffing material being conveyed through said outlet channel means via said shut-off and controlling means into said filling pipe means, and (f) activating means for activating said positioning drive means in an opposite direction over a predetermined angle of rotation.

7. A device for delivering a pasty stuffing material in portions, in particular in the production of sausages by filling said stuffing material into one of hose-shaped skins and guts held in readiness for such filling, said device comprising (a) pressure generating means for charging said stuffing material with static pressure, for generating a flow of material through said device in a predetermined conveying direction, (b) outlet channel means downstream of said pressure generating means when seen in said conveying direction, into which outlet channel means said stuffing material is conveyed, (c) shut-off and controlling means being arranged in the region of said outlet channel means, influencing and controlling said flow of said stuffing material and comprising vane rotor means extending through the cross-section of said outlet channel means, (d) filling pipe means downstream of said outlet channel means, (e) positioning drive means, connected with said vane rotor means, said pressurized stuffing material being conveyed through said outlet channel means via said shut-off and controlling means into said filling pipe means, (f) said positioning drive means being a hydraulic motor controlled by an incremental transmitter, and (g) activating means for activating said hydraulic motor means in an opposite direction over a predetermined angle of rotation thereof.

8. A device for delivering a pasty stuffing material in portions, in particular in the production of sausages by filling said stuffing material into one of hose-shaped skins and guts held in readiness for such filling, said device comprising (a) pressure generating means for charging said stuffing material with static pressure, for generating a flow of material through said device in a predetermined conveying direction, (b) outlet channel means downstream of said pressure generating means when seen in said conveying direction, into which outlet channel means said stuffing material is conveyed, (c) shut-off and controlling means being arranged in the region of said outlet channel means, influencing and controlling said flow of said stuffing material and comprising vane rotor means extending through the cross-section of said outlet channel means, (d) filling pipe means downstream of said outlet channel means, (e) positioning drive means, connected with said vane rotor means, said pressurized stuffing material being conveyed through said outlet channel means via said shut-off and controlling means into said filling pipe means, (f) said positioning drive means including hydraulic motor means controlled by an incremental transmitter, (g) at least one of the supply and discharge of pressurized fluid to and from said hydraulic motor means, respectively, is shut off for arresting said hydraulic motor means in its rest periods, and (h) activating means for activating said hydraulic motor means in an opposite direction over a predetermined angle of rotation.

9. A device for delivering a pasty stuffing material in portions, in particular in the production of sausages by filling said stuffing material into one of hose-shaped skins and guts held in readiness for such filling, said device comprising (a) pressure generating means for charging said stuffing material with static pressure, for generating a flow of material through said device in a predetermined conveying direction, (b) output channel means downstream of said pressure generating means when seen in said conveying direction, into which outlet channel means said stuffing material is conveyed, (c) shut-off and controlling means being arranged in the region of said outlet channel means, influencing and controlling said flow of said stuffing material and comprising vane rotor means extending through the cross-section of said outlet channel means, (d) filling pipe means downstream of said outlet channel means, (e) positioning drive means, connected with said vane rotor means, said pressurized stuffing material being conveyed through said outlet channel means via and shut-off and controlling means into said filling pipe means, (f) said positioning drive means including braking means and an incremental transmitter means for controlling said braking means, and (g) activating means for activating said hydraulic motor means in an opposite direction over a predetermined angle of rotation.

10. A device for delivering a pasty stuffing material in portions, in particular in the production of sausages by filling said stuffing material into one of hose-shaped skins and guts held in readiness for such filling, said device comprising (a) pressure generating means for charging said stuffing material with static pressure, for generating a flow of material through said device in a predetermined conveying direction, (b) outlet channel means downstream of said pressure generating means when seen in said conveying direction, into which outlet channel means said stuffing material is conveyed, (c) shut-off and controlling means being arranged in the region of said outlet channel means, influencing and controlling said flow of said stuffing material and comprising vane rotor means extending through the cross-section of said outlet channel means, (d) filling pipe means downstream of said outlet channel means, (e) positioning drive means, connected with said vane rotor means, said pressurized stuffing material being conveyed through said outlet channel means via said shut-off and controlling means into said filling pipe means, (f) said positioning drive means including a hydraulic motor means controlled by an incremental transmitter, (g) said hydraulic motor means including braking means, said incremental transmitter means controlling said braking means, and (h) activating means for activating said hydraulic motor means in an opposite direction over a predetermined angle of rotation.

* * * * *